Nov. 3, 1942.     H. O. ENGSTROM     2,301,169

HANDLE

Filed April 10, 1940

WITNESSES:
Edward Michaels
Arthur T. Stratton

INVENTOR
Henry O. Engstrom.
BY
Ralph H. Swingle
ATTORNEY

Patented Nov. 3, 1942

2,301,169

UNITED STATES PATENT OFFICE 2,301,169

HANDLE

Henry O. Engstrom, Bridgeport, Conn., assignor to The Bryant Electric Company, Bridgeport, Conn., a corporation of Connecticut Application April 10, 1940, Serial No. 328,900

7 Claims. (Cl. 287—53)

My invention relates generally to handle structures, and more particularly to removable handle structures for switches.

In certain applications, such for example as in electric switches, where an operating handle is mounted on an operating shaft at the front of a supporting panel, and the shaft extends to the rear of said panel to operate a switch at that point, it is highly desirable that such handles be quickly and easily detachable in a relatively simple manner, to permit ready access to the switch.

One object of my invention, therefore, is to provide a novel handle construction which is adapted for ready attachment to and detachment from an operating member.

Another object of my invention is to provide novel means in association with a detachable handle structure for keying and retaining the handle structure in operative relation with respect to an operating member.

Another object of my invention is to provide a novel spring construction adapted to both key and frictionally retain a detachable handle with respect to an operating member which is effective upon application of the handle to the member.

Another object of my invention is to provide a novel handle securing means which is effective to secure a handle in operative association with respect to an operating member by simply telescoping the handle on said member.

These and other objects of my invention will become more apparent upon consideration of the following detailed description of a preferred embodiment thereof taken in connection with the attached drawing, in which.

Figure 1:
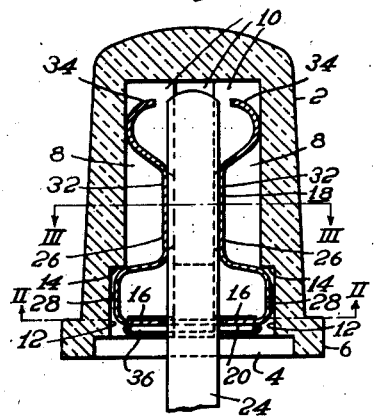
Figure 1 is a longitudinal sectional view through my novel handle construction and illustrating an end portion of an operating shaft assembled therewith.
Figure 2:
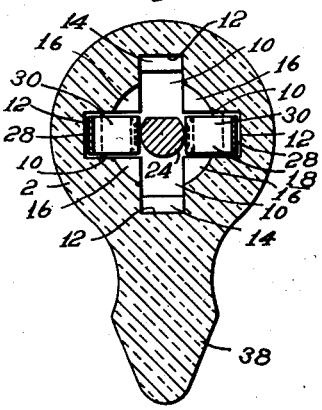
Fig. 2 is a sectional view taken on line II—II of Fig. 1.
Figure 3:
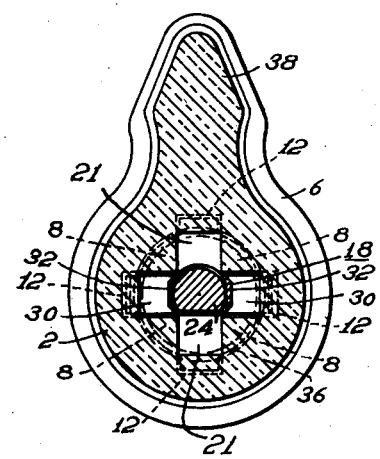
Fig. 3 is a transverse cross-sectional view taken substantially on the line III—III of Fig. 1.

Referring to the drawing, I have shown an insulating handle 2 which may be of any suitable insulating material such, for example, as porcelain, a molded insulation material or the like. As is apparent from Fig. 1, the handle 2 is provided with a cavity having an opening 4 at one end of the handle. This open end of the cavity is provided with a shallow peripheral flange 6 extending about the opening. The cavity in the handle which extends generally longitudinally thereof is substantially in the shape of a cross in section, with the handle being provided with integral substantially triangular shaped projections 8 forming rectangular channels 10 therebetween. The channels 10 extend substantially longitudinally of the handle and are positioned radially of the central cavity in the handle, and are spaced equidistant thereabout.

As shown particularly in Fig. 1, the outer portions of the channels 10 are cut deeper, as at 12, to provide shoulders 14 for a purpose to be hereinafter referred to. Outwardly of the cavity with respect to the shoulders 14, the triangular projections 8 are cut away diagonally to form outwardly facing shoulders 16 against which the disc portion of the spring retainer member is adapted to be seated.

Figure 4:
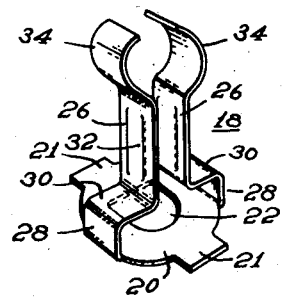
Fig. 4 is a perspective view of the spring locking and retainer member shown in Fig. 1.
Figure 5:
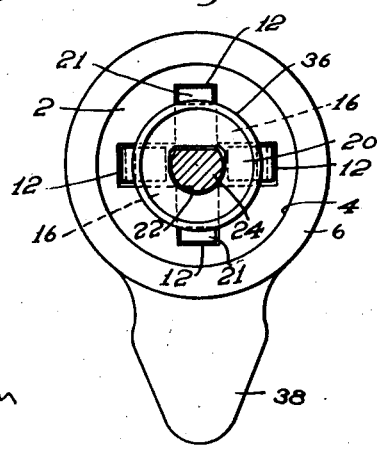
Fig. 5 is an elevational view of the open end of the handle with the spring locking and retainer member shown in Fig. 4 being in assembled position.

In Fig. 4, I have shown the above referred to spring retainer and locking member 18 which may be made of any desired resilient material, such for example, as a Phosphor-bronze alloy or the like. The retainer member 18, as shown, is generally U-shaped in form and includes a connecting base or bight portion 20 which is substantially disc-shaped in form. The bight portion 20 includes opposite, outwardly extending key portions 21, which are positioned substantially at right angles to the leg portions 26 of the retainer member 18. The bight portion 20 of the connector member 18 is provided with a central substantially D-shaped aperture 22 for receiving the D-shaped outer end of an operating shaft 24. Obviously, the aperture 22 and the shaft 24 may be of any other desired non-circular form, the D-form being shown merely for the purposes of illustration. As shown in Fig. 4, the spaced arms 26 of the retainer member 18 are integral with the bight portion 20 thereof and extend outwardly and substantially laterally with respect to the portion 20, as at 28, for a short distance and then are bent inwardly, as at 30, towards each other so as to space the arms a less distance than the thickness of the operating shaft 24. The arms 26, as shown, then extend laterally outwardly and these portions are provided with outwardly struck convex portions 32, extending longitudinally of the arms and substantially centrally thereof, to receive portions of the operating shaft 24 and properly position the same with respect to the arms 26. The arms 26 terminate in outwardly convex portions 34 for a purpose to be hereinafter described.

The retainer member 18, when assembled in the handle 2, is adapted to have the leg portions 26 thereof aligned with an opposite pair of channels 10, with the key portions 21 thereof received in the other opposed pair of channels 10. The key portions 21, and the portions 28 of the retainer member 18 received in the deeper portions 12 of their respective channels 10, together with the convex portions 34 of the retainer member received in the inner ends of the channels 10, effectively combine to lock the retainer member against rotation with respect to the handle 2 about the longitudinal axis thereof. Inward movement of retainer member 18 with respect to the handle 2 is limited by engagement of the disc portion 20 of the retainer member with the shoulders 16 of the handle, and by engagement of the outer ends of the portions 30 of the retainer member with the shoulders 14 of the handle member 2. The retainer member 18 is locked against removal outwardly of the handle cavity by a split resilient retainer ring 36 seated in a shallow groove adjacent the open end of the handle.

The retainer member 18, prior to insertion of the shaft 24 therein, normally assumes a position wherein the legs 26 of the retainer member converge towards each other. Upon insertion of the shaft member 24, or upon telescoping of the handle over the shaft 24, the shaft enters through aperture 22 in the retainer member 18 and moves between the legs 26 thereof to spread the same, thereby stressing the legs resiliently and moving them away from each other until the outer convex portions 34 thereof engage the inner walls of their respective channels 10. It should be noted that the leg portions 26 of the retainer member 18 are themselves substantially U-shaped in form with the leg portions thereof diverging from each other. Therefore, upon continued separating movement of the leg portions 26 due to the camming effect of the shaft 24 introduced therebetween, and after the convex portions 34 thereof have engaged the bottom walls of their respective channels 10, further movement will tend to further diverge the leg portions of the U-shaped members 26 thus, in effect, straightening out these legs to further stress the resilient material of the retainer member 18. It is thereby apparent that the legs 26 are stressed in two different ways, first by being separated from each other, and second by the straightening action on the legs themselves, all effected by introduction of the shaft 24 between the legs to thereby provide a high frictional engagement between the legs 26 and the shaft 24. This high friction force is very desirable to prevent accidental withdrawal of the handle from the shaft.

The means whereby the retainer member 18 is locked, in effect, against rotation with respect to the handle 2 has previously been described, and it can be seen that when the shaft 24 is received within the handle, that the shaft is locked against rotation with respect to the member 18 by virtue of the close fit between its noncircular end portion and the similarly shaped aperture 22 in the member 18. This obviously operates to lock the shaft 24 against rotation with respect to the handle 2. The legs 26 with struck-out portions 32 therein provide facing grooves for receiving the operating shaft, which when the shaft 24 is in assembled position functions to prevent lateral movement of the free end of the shaft relative to the handle.

It is, therefore, apparent that I have provided a novel handle construction provided with a single means which operates to both lock the handle for rotation with an operating shaft member, and also is effective to produce a relatively high friction force between the handle and shaft to prevent accidental separation of these parts. It is also apparent that this connection may be effected merely by pushing the handle on the shaft, and that no other manipulation to effect this connection is necessary.

It should be noted that the particular shape of the cavity in the handle is especially suited for easy assembly and adjustment of the retainer member 18 with respect to the handle, to properly position the handle with respect to the operating shaft 24 irrespective of the particular angular position of the shaft. By the particular cross-shape of the interior of the handle cavity, it is obvious that the retainer member 18 may be mounted therein in a plurality of angular positions substantially 90° apart, and locked in any one of these positions by the retaining ring 36. This is a distinct advantage in assembling the handle parts, inasmuch as it is possible to merely drop the retaining member 18 into the handle cavity and then insert the retainer ring 36 in position. This is also of advantage in supplying replacement handles where the operating shafts 24 may be at various angular positions, so that to obtain the proper indicating position of the handle, it is merely necessary to adjust the retaining member 18 so that the arms thereof rest in the proper channels 10.

Merely by way of illustration, I have shown the switch handle 2 as being provided with an integral arrow-shaped indicating projection 38. However, it is obvious that any other desired type of indicating means may be provided in lieu of the projection 38.

Having described a preferred embodiment of my invention in accordance with the patent statutes, I desire that this invention be not limited to the particular embodiment disclosed inasmuch as it will be obvious particularly to persons skilled in the art that many changes and modifications may be made therein without departing from the broad spirit and scope of my invention. Therefore, I desire that my invention be interpreted as broadly as possible and that it be limited only by what is expressly set forth in the following claims.

I claim as my invention:

1. In a detachable knob construction for mounting on a non-circular shaft, resilient means non-rotatably retained in a cavity in said knob, said means including a non-circular opening for slidably but non-rotatably receiving said shaft, and a resilient member having a surface extending substantially laterally of the plane of said opening so as to frictionally engage said shaft when inserted through said opening to prevent accidental withdrawal thereof, while permitting manual withdrawal by exerting sufficient force to overcome the friction between said resilient portion and shaft.

2. In a detachable knob construction for mounting on a non-circular shaft, substantially U-shaped resilient means non-rotatably retained in a cavity in said knob, said means including a non-circular opening through the bight portion thereof for slidably but non-rotatably receiving said shaft, and the leg portions thereof presenting opposed surfaces positioned to frictionally engage said shaft therebetween to prevent accidental withdrawal thereof, while permitting manual withdrawal by exerting sufficient force to overcome the friction between said resilient portion and shaft.

3. In an operating knob having a cavity for receiving a shaft, means retained in said cavity for releasably securing the knob and shaft in assembled operative relation including a portion secured against rotation with respect to said handle and adapted to slidably and non-rotatably engage said shaft, and spaced, opposed inwardly extending and inwardly bowed resilient arms positioned to be stressed outwardly by the insertion of said shaft into engagement with the walls of said cavity in a manner to flatten the bowed portions thereof.

4. In an operating knob having a cavity for receiving a shaft, means non-rotatably retained in said cavity for releasably securing the knob and shaft in assembled operative relation including a portion extending substantially transversely of said cavity and having an aperture therein, said portion adapted to drivingly engage said shaft when inserted in said aperture, said means further including a leaf spring member having a flat surface positioned to extend along and frictionally engage one side of said shaft.

5. In an operating knob having a cavity for receiving a shaft, means retained in said cavity for releasably securing the knob and shaft in assembled operative relation including a portion extending substantially transversely of said cavity, said portion adapted to drivingly engage said shaft when inserted in said aperture, said means further including a leaf spring member positioned to extend along and frictionally engage one side of said shaft, and said member having spaced outwardly bent portions adapted to be received in depressions provided in the inner wall of said cavity to drivingly connect said knob and means.

6. In an operating knob having a cavity for receiving a shaft, means retained in said cavity for releasably securing the knob and shaft in assembled operative relation including a portion secured against rotation with respect to said handle and adapted to slidably and non-rotatably engage said shaft, and at least one inwardly extending and inwardly bowed resilient arm positioned to be stressed outwardly by the engagement of said shaft so as to be moved into engagement with a wall of said cavity in a manner to flatten the bowed portion thereof.

7. In an operating knob having a cavity for receiving a shaft, means retained in said cavity for releasably securing the knob and shaft in assembled operative relation including a portion secured against rotation with respect to said handle and adapted to slidably and non-rotatably engage said shaft, at least one inwardly biased part in said cavity adapted to be engaged by a part of said shaft when inserted in said cavity to frictionally retain said knob on said shaft, and at least one of said parts having a substantially smooth surface engageable with the other of said parts to permit separation of said knob and shaft upon the application of a force sufficient to overcome the friction between said parts.

HENRY O. ENGSTROM.